United States Patent
Krick et al.

(10) Patent No.: US 12,552,881 B2
(45) Date of Patent: Feb. 17, 2026

(54) FLUOROPOLYMER-CONTAINING COMPOSITE MATERIALS AND METHODS

(71) Applicant: The Florida State University Research Foundation, Inc., Tallahassee, FL (US)

(72) Inventors: Brandon Alexander Krick, Tallahassee, FL (US); Kylie Van Meter, Tallahassee, FL (US); Tomas F. Babuska, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 657 days.

(21) Appl. No.: 18/056,866

(22) Filed: Nov. 18, 2022

(65) Prior Publication Data
US 2023/0159677 A1   May 25, 2023

Related U.S. Application Data

(60) Provisional application No. 63/281,137, filed on Nov. 19, 2021.

(51) Int. Cl.
*C08F 114/26* (2006.01)
*C08L 27/12* (2006.01)
*C08L 27/18* (2006.01)
*C08L 61/18* (2006.01)

(52) U.S. Cl.
CPC ............. *C08F 114/26* (2013.01); *C08L 27/18* (2013.01); *C08L 61/18* (2013.01)

(58) Field of Classification Search
CPC ......... B32B 9/045; B32B 27/08; B32B 27/20; B32B 2327/12; B32B 2327/28; C08L 27/18; C08L 71/12; C08F 114/26
See application file for complete search history.

(56) References Cited

U.S. PATENT DOCUMENTS

2006/0029795 A1* 2/2006 Sawyer .................. B32B 27/08 428/339
2021/0380792 A1* 12/2021 Liu ........................ C08K 3/016

OTHER PUBLICATIONS

Onodera et al; The Journal of Physical Chemistry C; v121; pp. 14587-14590 (Year: 2017).*
Burris, David L. et al., A low friction and ultra low wear rate PEEK/PTFE composite, Wear 261, 2006, 410-418.
Haidar, Diana R. et al., Tribological Insensitivity of an Ultralow-Wear Poly(etheretherketone)-Polytetrafluoroethylene Polymer Blend to Changes in Environmental Moisture, J. Phys. Chem. C 2018, 122, 5518-5524.
Onodera, Tasuku et al., Structure and Function of Transfer Film Formed from PTFE/PEEK Polymer Blend, J. Phys. Chem. C 2017, 121, 14589-14596.

* cited by examiner

*Primary Examiner* — Karuna P Reddy
(74) *Attorney, Agent, or Firm* — Eversheds Sutherland (US) LLP

(57) ABSTRACT

Composite materials that include fluoropolymers. Methods of reducing friction, which may include contacting a first article and a second article that include or are formed of one or more fluoropolymers. The composite materials may include a fluorinated polymer and a first filler. The first filler may be present at an amount of about 3% to about 50%, by weight, based on the total weight of the first fluorinated polymer and the first filler.

12 Claims, 10 Drawing Sheets

FLUOROPOLYMER-CONTAINING COMPOSITE MATERIALS AND METHODS

CROSS-REFERENCE TO RELATED APPLICATIONS

This application claims priority to U.S. Provisional Patent Application No. 63/281,137, filed Nov. 19, 2021, which is incorporated herein by reference.

BACKGROUND

Ultralow wear perfluoropolymer-based composites have been reported, and typically include perfluoropolymers filled with organic and inorganic fillers. These systems are typically configured to slide against steel and other metal countersamples.

There remains a need for composite materials, including perfluoropolymer-based composite materials, that (i) are configured to slide against (a) another perfluoropolymer composite and/or (b) materials other than steel or other metal countersamples, (ii) exhibit lower wear rates and/or friction coefficients, or (iii) a combination thereof.

BRIEF SUMMARY

Provided herein are embodiments of composite materials with lower wear rates and/or friction coefficients. The composite materials, compared to known materials, may lower wear rates and/or friction coefficients by a surprising and unexpected extent.

In some embodiments, the composite materials described herein are self-mated ultralow wear perfluoropolymer composites. The composite materials provided herein may include an ultralow wear material pairing for dry/unlubricated sliding and bearing applications. The composite materials may be used in lubricated applications. In some embodiments, ultralow wear perfluoropolymer composites (e.g., polytetrafluoroethylene (PTFE), perfluoroalkoxy alkane (PFA), or other fluoropolymer including specific fillers) are paired with other ultralow wear perfluoropolymer composites.

In one aspect, composite materials are provided. In some embodiments, the composite materials include a first fluorinated polymer; and a first filler dispersed in the first fluorinated polymer. The first filler may be present at an amount of about 3% to about 50%, by weight, based on the total weight of the first fluorinated polymer and the first filler. The first filler may include a first polymeric filler, or a first aryl polymeric filler. In some embodiments, the composite material is in the form of a first film or a first article. In some embodiments, the composite materials also include a second film or a second article. The second film or the second article may be in contact with the first film or the first article. The second film or the second article may be formed from a second fluorinated polymer and a second filler, wherein the second filler is dispersed in the second fluorinated polymer.

In another aspect, methods of reducing friction are provided. In some embodiments, the methods include providing a first article (i) formed at least in part of a first composite material, or (ii) having a surface on which the first composite material is disposed. The first composite material may include a first fluorinated polymer and a first filler dispersed in the fluorinated polymer. The first filler may be present at an amount of about 3% to about 50%, by weight, based on the total weight of the first fluorinated polymer and the first filler. The methods may include providing a second article (i) formed at least in part of a metal, (ii) formed at least in part of a second composite material, or (iii) having a surface on which the second composite material is disposed. The second composite material may include a second fluorinated polymer; and a second filler dispersed in the second fluorinated polymer. The second filler may be present at an amount of about 3% to about 50%, by weight, based on the total weight of the second fluorinated polymer and the second filler. The methods may include contacting the first composite material and the metal of the second article, or the first composite material and the second composite material.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Embodiments of the composite materials described herein can improve the wear rate and/or friction coefficient of already ultralow wear perfluoropolymer composite systems. For example, a 30 wt % PEEK/80 wt % PTFE composite exhibited a friction coefficient on 304 stainless steel of 0.11, but a 0.08 friction coefficient was observed for an embodiment of a self-mated composite material described herein (i.e., a 37.5% improvement). Moreover, the steady state wear rate after 1 million sliding cycles in a standard experiment reduced from $2.6 \times 10^{-7}$ mm$^3$/Nm on 304 stainless steel to $4.2 \times 10^{-9}$ mm$^3$/Nm self-mated.

Composite Materials

In one aspect, composite materials are provided herein. The composite materials may include a fluorinated polymer and a filler. The filler may be dispersed, evenly or unevenly, in the fluorinated polymer.

The composite material generally may be in any form. In some embodiments, the composite material is in the form of a film or other article. When a composite material is in the form of a film, the composite material may be arranged on a surface, such as a surface of another article, which may or may not be formed of a composite material described herein.

Figure 1A:
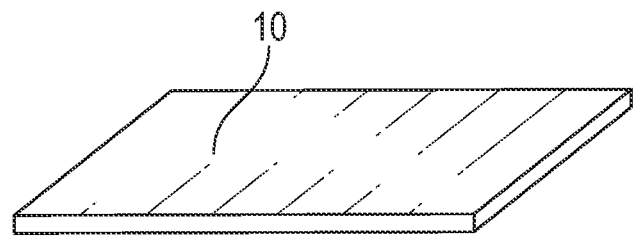
FIG. 1A depicts an embodiment of a film of a composite material.
Figure 1B:
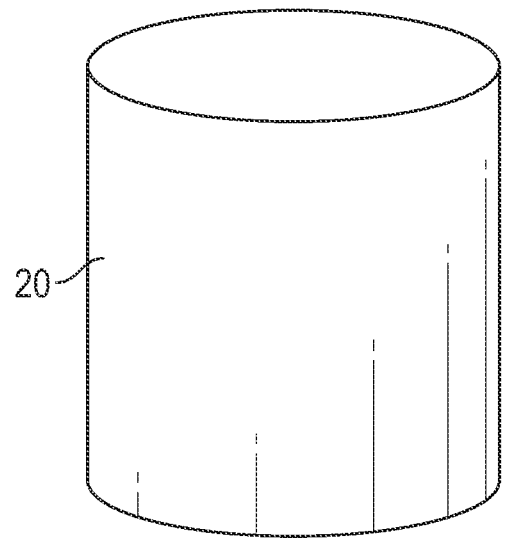
FIG. 1B depicts an embodiment of an article formed of a composite material.
Figure 1C:
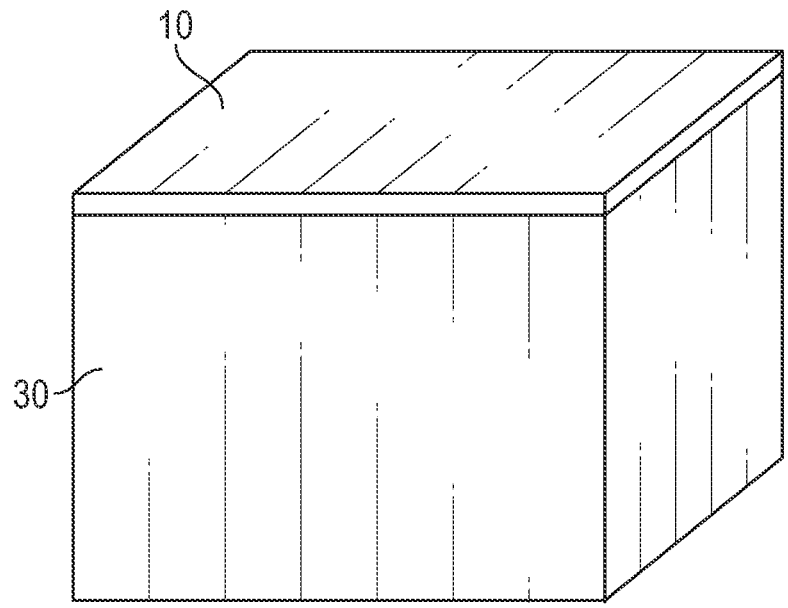
FIG. 1C depicts an embodiment of an article having a surface on which a film of a composite material is arranged.

FIG. 1A depicts an embodiment of a composite material, as described herein, in the form of a film. FIG. 1B depicts an embodiment of a cylinder-shaped article formed from a composite material described herein. FIG. 1C depicts an embodiment in which the composite material 10 of FIG. 1A is arranged on a surface of another article 30. Article 30 may or may not be formed of a composite material as described herein. Although the composite material 10 of FIG. 1C contacts the entire area of one surface of the article 30, other embodiments are envisioned, such as embodiments in which a composite material contacts a partial area of one surface of an article, and embodiments in which a composite materials contacts, partially or entirely, more than one surface of an article.

In some embodiments, the composite materials include a first film or a first article that is in contact with a second film or a second article. The first film or the first article may be formed, at least in part, of a first fluorinated polymer and a first filler, wherein the first filler is dispersed, evenly or unevenly, in the first fluorinated polymer. The second film or the second article may be formed, at least in part, of a second fluorinated polymer and a second filler, wherein the second filler is dispersed, evenly or unevenly, in the second fluorinated polymer. The first fluorinated polymer and the second fluorinated polymer may be the same or different.

Fluorinated Polymers

As used herein, the phrase "fluorinated polymer" generally refers to a polymer that includes at least one fluorine substituent, e.g., at least one hydrogen atom replaced with a fluorine atom. The fluorinated polymer may include at least one fluorine substituent per monomer unit, but if any one monomer unit of a polymer includes a fluorine substituent, then the polymer is a fluorinated polymer, as defined herein.

As used herein, the phrase "perfluorinated polymer" generally refers to a polymer in which each and every hydrogen atom is replaced with a fluorine atom. Therefore, a perfluorinated polymer includes only carbon-carbon and carbon-fluorine covalent bonds.

The fluorinated polymer(s) of the composite materials described herein may be perfluorinated polymer(s). For example, (i) a first fluorinated polymer may be a first perfluorinated polymer, (ii) a second fluorinated polymer may be a second perfluorinated polymer, or (iii) a first fluorinated polymer may be a first perfluorinated polymer, and a second perfluorinated polymer may be a second perfluorinated polymer.

In some embodiments, (i) a first fluorinated polymer is polytetrafluoroethylene (PTFE), (ii) a second fluorinated polymer is polytetrafluoroethylene (PTFE), or (iii) a first fluorinated polymer is polytetrafluoroethylene (PTFE), and a second fluorinated polymer are polytetrafluoroethylene.

In some embodiments, the polytetrafluoroethylene polymers are independently selected from a polytetrafluoroethylene of the following formula:

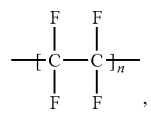

wherein n is 20,000 to 200,000. In some embodiments, n is 50,000 to 200,000, 100,000 to 200,000, or 150,000 to 200,000. In some embodiments, n is 20,000 to 150,000, 20,000 to 100,000, or 20,000 to 50,000.

Fillers

The fillers described herein generally may be present in the composite materials at any amount. In some embodiments, the filler, such as a first filler, is present at an amount of about 3% to about 50%, about 10% to about 50%, about 20% to about 50%, about 30% to about 50%, or about 40% to about 50%, by weight, based on the total weight of the fluorinated polymer, such as a first fluorinated polymer, and the filler, such as a first filler.

In some embodiments, the filler is an organic filler. In some embodiments, the filler is a polymeric filler, such as a thermoplastic polymer. In some embodiments, the filler is an aryl polymeric filler, such as a polyaryletherketone (PAEK). In some embodiments, the filler is a polyether ether ketone (PEEK).

When a "first filler" and a "second filler" are present in a composite material, then the first filler and the second filler may be the same or different. For example, the first filler and the second filler may include (i) polyether ether ketones having the same or different weight average molecular weights, or (ii) polyether ether ketone and a different organic filler.

In some embodiments, the filler is an inorganic filler, such as a metal oxide, for example, alumina (e.g., alpha-alumina). In some embodiments, the filler does not include an inorganic filler, such as a metal oxide, for example, alumina (e.g., alpha-alumina). For example, when a "first filler" and a "second filler" are present, the first filler, the second filler, or both the first filler and the second filler may not be, or include, an inorganic filler, such as a metal oxide, for example, alumina.

Methods of Reducing Friction

In one aspect, methods of reducing friction, e.g., between two structures (articles) in contact with one another, are provided. The methods may include "self-mating" two composite materials described herein, wherein the composite materials are the same or different. In some embodiments, the methods include providing a first article (i) formed at least in part of a first composite material, or (ii) having a surface on which the first composite material (e.g., a film of the first composite material) is disposed.

The first composite material may include any of those described herein. In some embodiments, the first composite material includes a first fluorinated polymer, and a first filler dispersed in the fluorinated polymer. The first filler may include any of those described herein. In some embodiments, the first filler is a polymeric filler.

In some embodiments, the methods include providing a second article (i) formed of a metal, (ii) formed at least in part of a second composite material, or (iii) having a surface on which a second composite material (e.g., a film of a second composite material) is disposed. The second composite material may include any of those described herein. In some embodiments, the second composite material includes a second fluorinated polymer, and a second filler dispersed in the second fluorinated polymer. The second filler may include any of those described herein. In some embodiments, the second filler is a second polymeric filler.

The methods may include contacting (i) the first composite material and the metal of the second article, or (ii) the first composite material and the second composite material.

The methods also may include applying a force to the first article and/or the second article while the first composite material and the second composite material are in contact with each other, wherein the force is effective to move the first article relative to the second article. Before, during, and/or after the movement of the first article relative to the second article, the first composite material and the second composite material may remain in contact with each other. The force may include a compressive force, shearing force, or a combination thereof.

The methods and materials described herein may be effective to reduce static friction, rolling friction, or sliding friction between two objects, e.g., the interfacing surfaces of the two objects.

In some embodiments, the methods described herein also include applying a cycle of forces to the first article. The cycle of forces may include a first force and a second force.

In some embodiments, the cycle of forces includes a first force applied to the first article while the first composite material and the second composite material are in contact with each other at a first position, wherein the first force is effective to move the first article to a second position, wherein the first article and the second article are in contact with each other at the first position, the second position, and while the first article is moved from the first position to the second position; and a second force applied to the first article when the first article is at the second position, wherein the second force is effective to move the first article from the second position to the first position or a third position, wherein the first article and the second article are in contact with each other at the second position, the first position or the third position, and while the first article is moved from the second position to the first position or the third position.

The first force may be of any magnitude and/or direction effective to move the first article from a first position to a second position. The second force may be of any magnitude and/or direction effective to move the first article from the second position to the first position or a third position. In some embodiments, the first force and/or the second force includes a compressive force; for example, a compressive force of at least 50 N, 100 N, 150 N, 200 N, or 250 N.

The first composite material, the second composite material, or both the first and the second composite material may exhibit a desirable wear rate. For example, the first and/or second composite material may exhibit a steady state wear rate of about $10^{-8}$ mm$^3$/Nm to about $10^{-9}$ mm$^3$/Nm, such as when the cycle of forces is applied 10,000 to 3,000,000 times, 50,000 to 3,000,000 times, 100,000 to 3,000,000 times, or 500,000 to 3,000,000 times. In some embodiments, when the cycle of forces is applied 10,000 to 3,000,000 times, 50,000 to 3,000,000 times, 100,000 to 3,000,000 times, or 500,000 to 3,000,000 times, the first force and the second force include a compressive force of at least 200 N, and the first composite material, the second composite material, or the first composite material and the second composite material exhibit a steady state wear rate of about $10^{-9}$ mm$^3$/Nm to about $10^{-8}$ mm$^3$/Nm.

In some embodiments, the cycle of forces is applied 10,000 to 3,000,000 times, 50,000 to 3,000,000 times, 100,000 to 3,000,000 times, or 500,000 to 3,000,000 times, and (i) the first fluorinated polymer, the second fluorinated polymer, or the first fluorinated polymer and the second fluorinated polymer at least partially degrades via (a) shear-induced chain scission, (b) reaction with water and/or oxygen, or (c) a combination thereof, and/or (ii) a concentration of the first filler, the second filler, or the first filler and the second filler increases at an interface between the first composite material and the second composite material. A concentration "increases at an interface" when a concentration gradient of a filler within a composite material is formed or increased, wherein, due to the formed or increased concentration gradient, the concentration of filler generally decreases as the distance between the interface and the point of measurement increases. These reactions and changes in concentration are determined by infrared (IR) spectroscopy, as explained in the following examples.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When compositions and methods are claimed or described in terms of "comprising" various steps or components, the devices, systems, or methods can also "consist essentially of" or "consist of" the various steps or components, unless stated otherwise.

The terms "a," "an," and "the" are intended to include plural alternatives, e.g., at least one. For instance, the disclosure of "a perfluorocarbon", "a filler", and the like, is meant to encompass one, or mixtures or combinations of more than one perfluorocarbon, filler, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that the first filler is present at an amount of about 40% to about 50%, by weight, based on the total weight of the first fluorinated polymer and the first filler. This range should be interpreted as encompassing about 40% and about 50%, and further encompasses "about" each of 41%, 42%, 43%, 44%, 45%, 46%, 47%, 48%, and 49%, including any ranges and sub-ranges between any of these values.

As used herein, the term "about" means plus or minus 10% of the numerical value of the number with which it is being used.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Preparation and Testing of Composite Materials

In this example, a series of composite materials were fabricated and tested. The samples were prepared by subjecting the components to dispersion in isopropanol (IPA), compression molding, free sintering, and machining into the form of a polymer pin or substrate. The samples were sonicated in methanol for 30 minutes, and allowed to dry.

The composites tested in this example included the following components:

| Sample No. | Polymer | Filler |
|---|---|---|
| 1 | Polytetrafluoroethylene (PTFE) | α-alumina (5 wt %) |
| 2 | PTFE | None |
| 3 | PTFE | Polyether ether ketone (PEEK)(10 wt %) |
| 4 | PTFE | PEEK (20 wt %) |
| 5 | PTFE | PEEK (30 wt %) |
| 6 | PTFE | PEEK (40 wt %) |
| 7 | PTFE | PEEK (50 wt %) |

For each of Samples 1-6, two pins (6.35 mm×6.35 mm) were machined from the same molded sample. Each was tested on different substrates: one on a SAE 304 stainless steel (304SS) substrate and one in a self-mated configuration. The substrates, therefore, were formed of polished 304SS or the same material as the pin (for the self-mated tests). In this example, the experimental parameters were as follows:

| Experimental Parameters | |
|---|---|
| Normal Load | 250N |
| Sliding Speed | 50 mm/s |
| Stroke | 20 mm (40 mm per cycle) |
| Total Cycles | 1,000,000 |
| Environment | 30% Relative Humidity |

Figure 2:
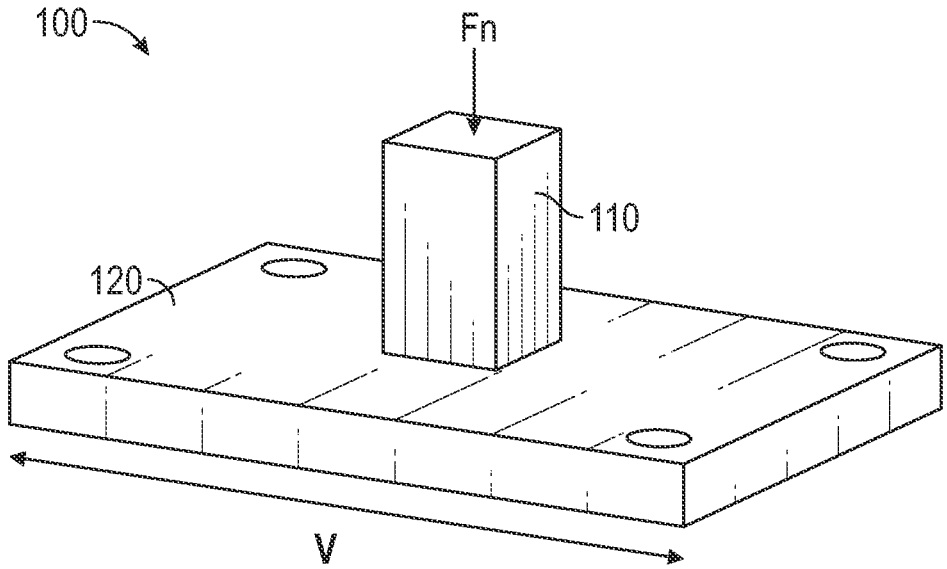
FIG. 2 depicts an embodiment of a polymer pin and a substrate.

A schematic 100 of a polymer pin and substrate is provided at FIG. 2. FIG. 2 shows the flat-on-flat contact achieved between the polymer pin 110 and the substrate 120.

As demonstrated by the following results, the embodiments of PEEK-PTFE composite materials tested in this example, when run against each other in a self-mated configuration, achieved lower friction and wear than the same composites on steel (i.e., 304SS). All of the PEEK-PTFE samples in this example achieved steady state wear rates of $10^{-9}$, regardless of the weight percentage of PEEK in each composite material.

Sample 1, as demonstrated by the following results, exhibited higher wear in the self-mated configuration than on stainless steel. The infrared (IR) data, as depicted in the following figures, demonstrated that PTFE alumina still had tribochemistry when self-mated, but much less than on steel. Sample 1 apparently did not have the hardness required (as a substrate) to break down alumina particles in the same or similar manner as steel.

The IR data also showed that the self-mated PEEK-PTFE embodiments expressed more PEEK accumulation (and potentially tribochemical species) than on steel. The samples with very different steel and self-mated wear rates had very different spectra (i.e., the closer the wear rates, the more closely the peaks matched). The mechanism for the low wear of PEEK-PTFE did not require the presence of steel in these tests. In the self-mated configurations, more PEEK was accumulated at the surface, and friction was most likely lower due to the inherent characteristics of the material itself.

It appeared that self-mated PEEK-PTFE removed, or at least lessened, the importance of filter weight percentage in tribological performance, and generally resulted in consistent wear rates in the $10^{-9}$ range for all PEEK-PTFE composites up to 50 wt %.

Figure 3:
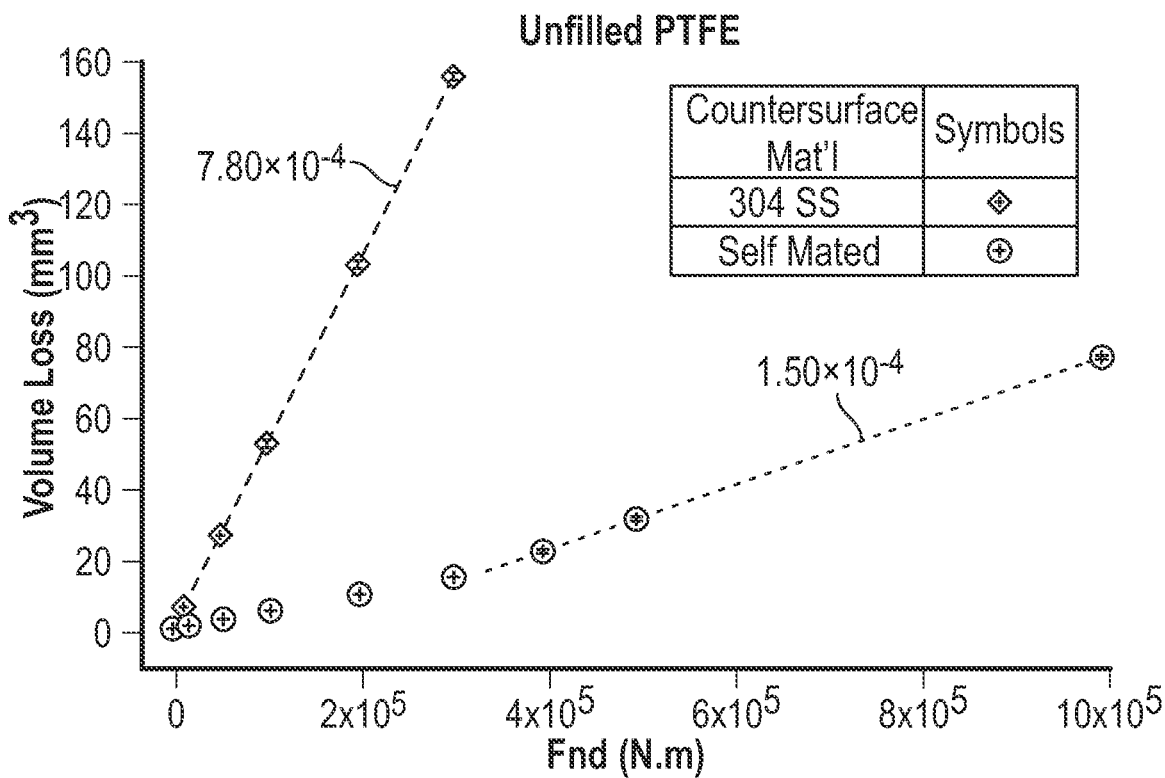
FIG. 3 depicts the volume loss observed for an embodiment of a material contacted with various substrates.

FIG. 3 depicts the volume loss observed for Sample 2 (unfilled PTFE) when tested with the foregoing countersurface materials, i.e., 304SS and self-mated.

Figure 4:
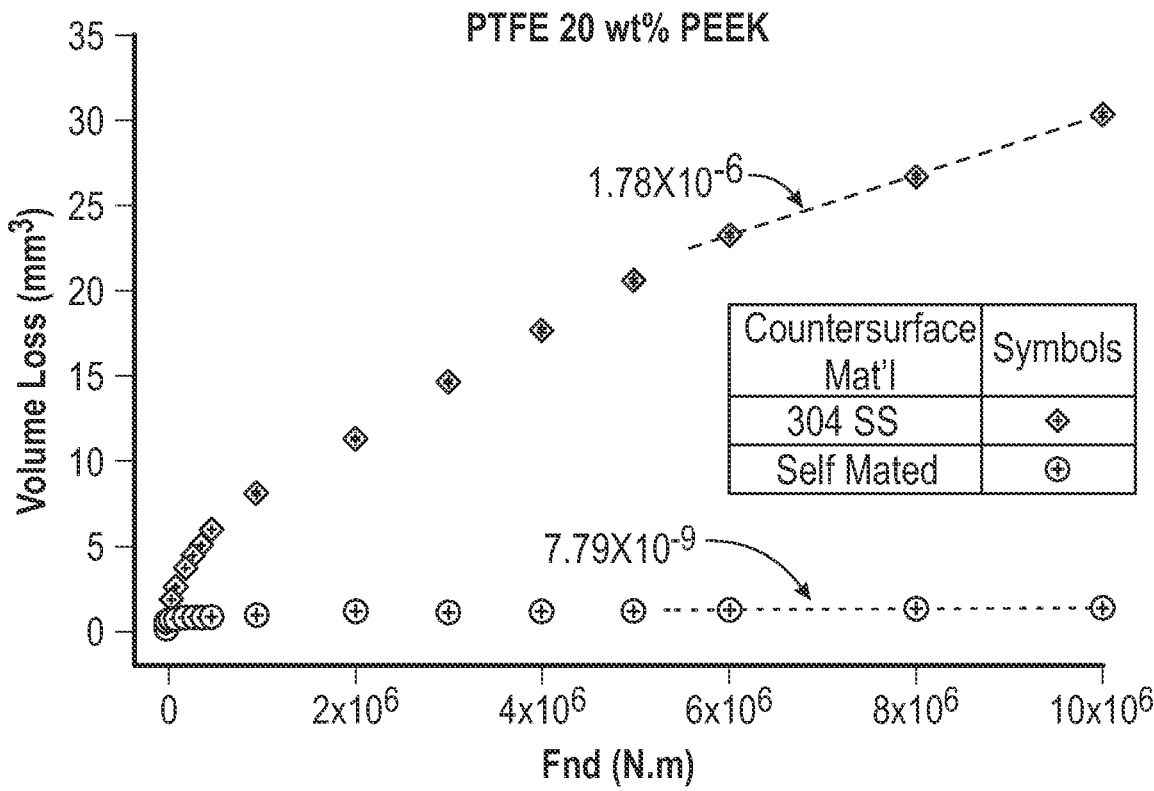
FIG. 4 depicts the volume loss observed for an embodiment of a material contacted with various substrates.

FIG. 4 depicts the volume loss observed for Sample 4 when tested with the foregoing countersurface materials, i.e., 304SS and self-mated.

Figure 5:
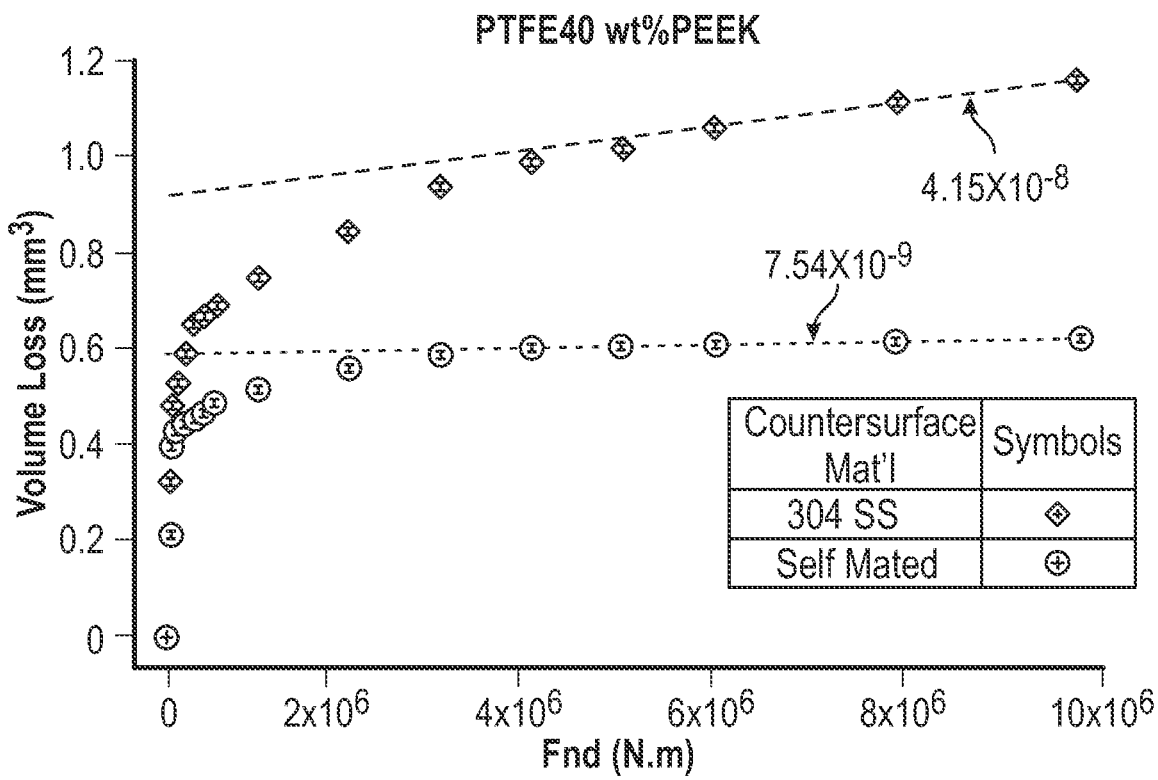
FIG. 5 depicts the volume loss observed for an embodiment of a material contacted with various substrates.

FIG. 5 depicts the volume loss observed for Sample 6 when tested with the foregoing countersurface materials, i.e., 304SS and self-mated.

Figure 6:
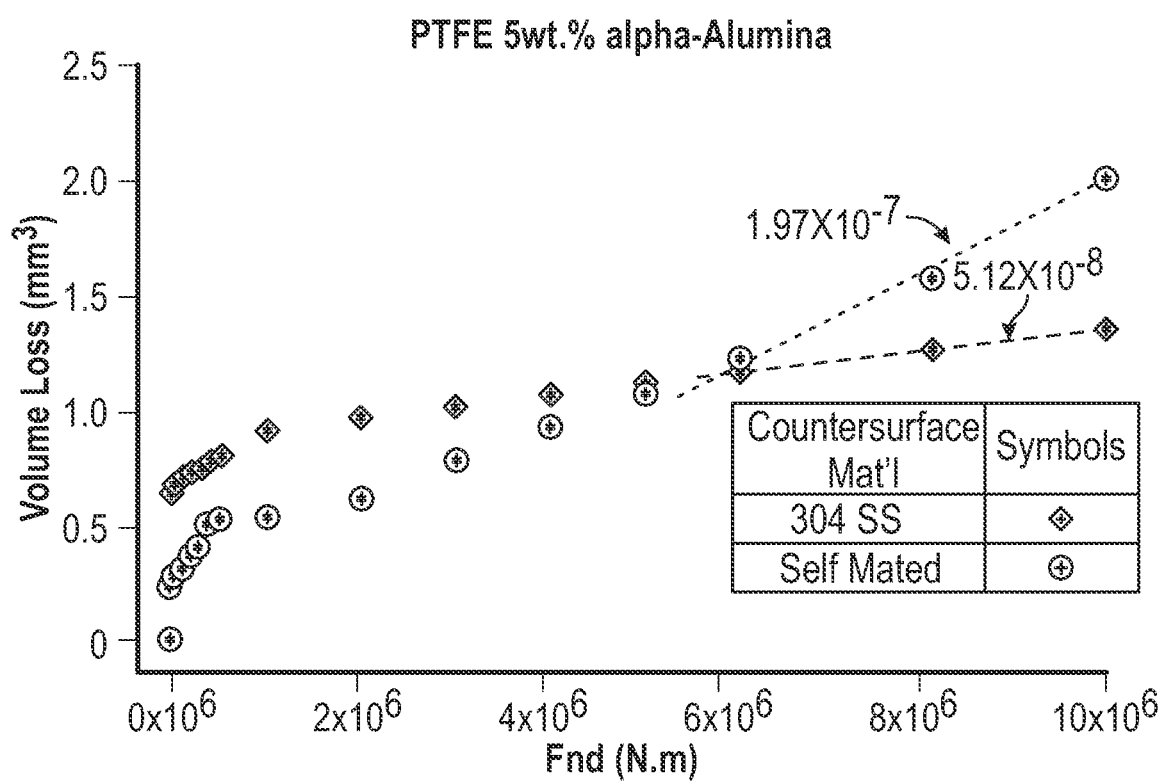
FIG. 6 depicts the volume loss observed for an embodiment of a material contacted with various substrates.

FIG. 6 depicts the volume loss observed for Sample 1 when tested with the foregoing countersurface materials, i.e., 304SS and self-mated.

Figure 7:
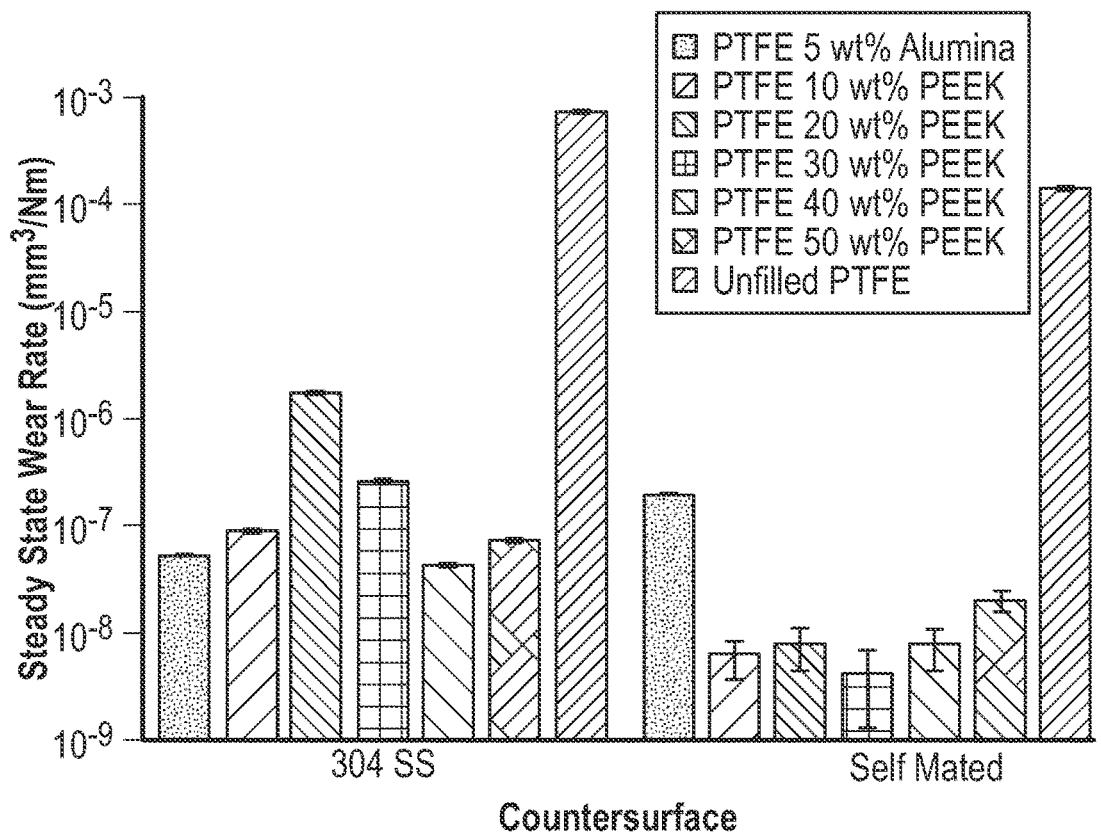
FIG. 7 depicts the steady state wear rate and the friction coefficient observed for several embodiments of composite materials.
Figure 8:
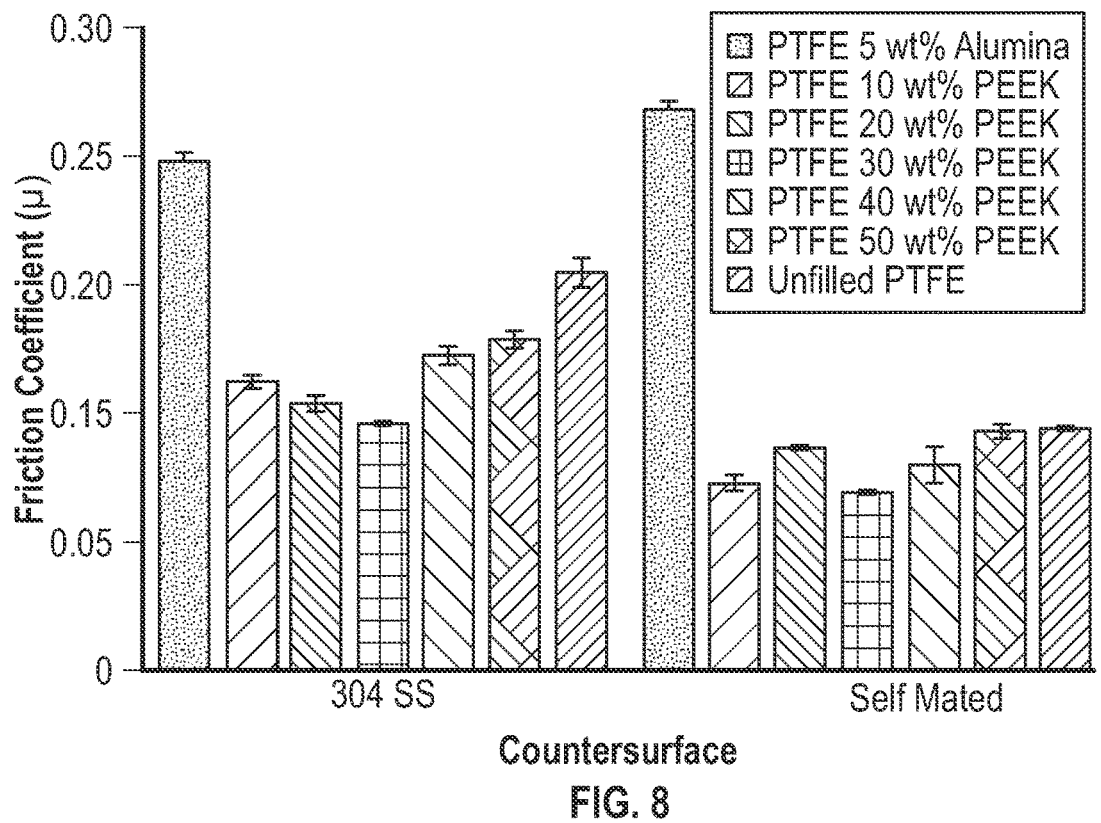
FIG. 8 depicts the steady state wear rate and the friction coefficient observed for several embodiments of composite materials.
Figure 9:
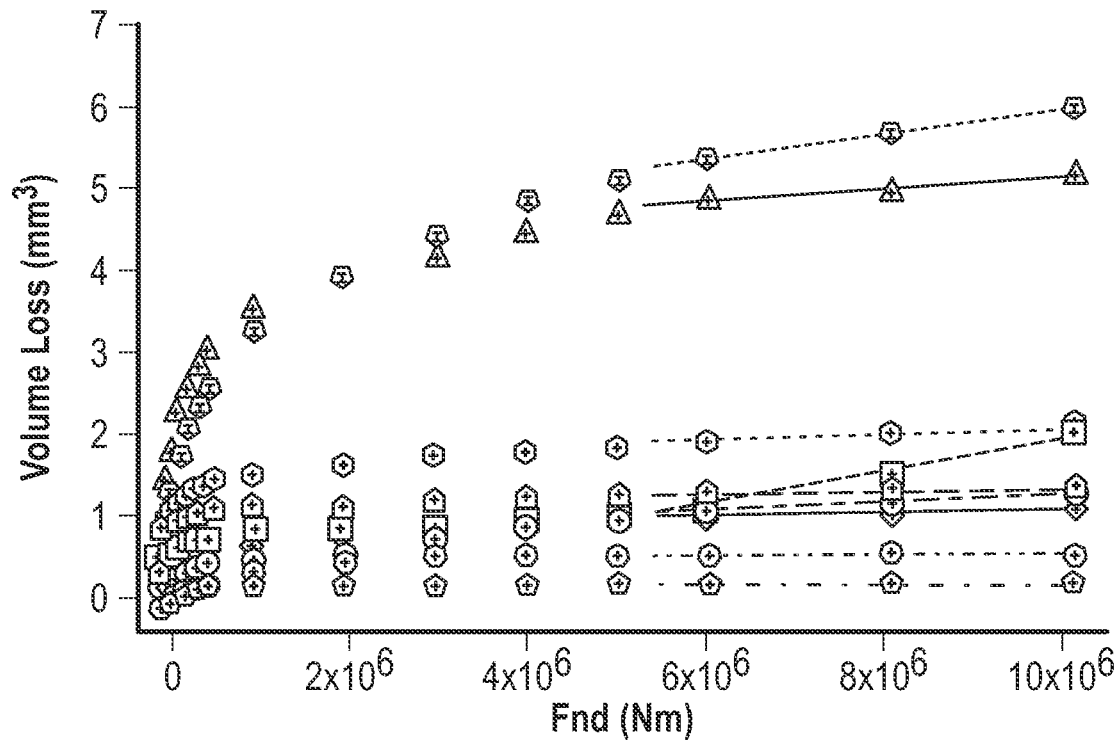
FIG. 9 depicts the volume loss observed for several embodiments of composite materials.

FIG. 7 and FIG. 8 depict the steady state wear rate and the friction coefficient observed in this example for Samples 1-7 when the countersurface was 304SS or self-mated, as described herein. FIG. 9 depicts the volume loss observed for Samples 1 and 3-7 for the 304SS substrate and self-mated.

Figure 10:
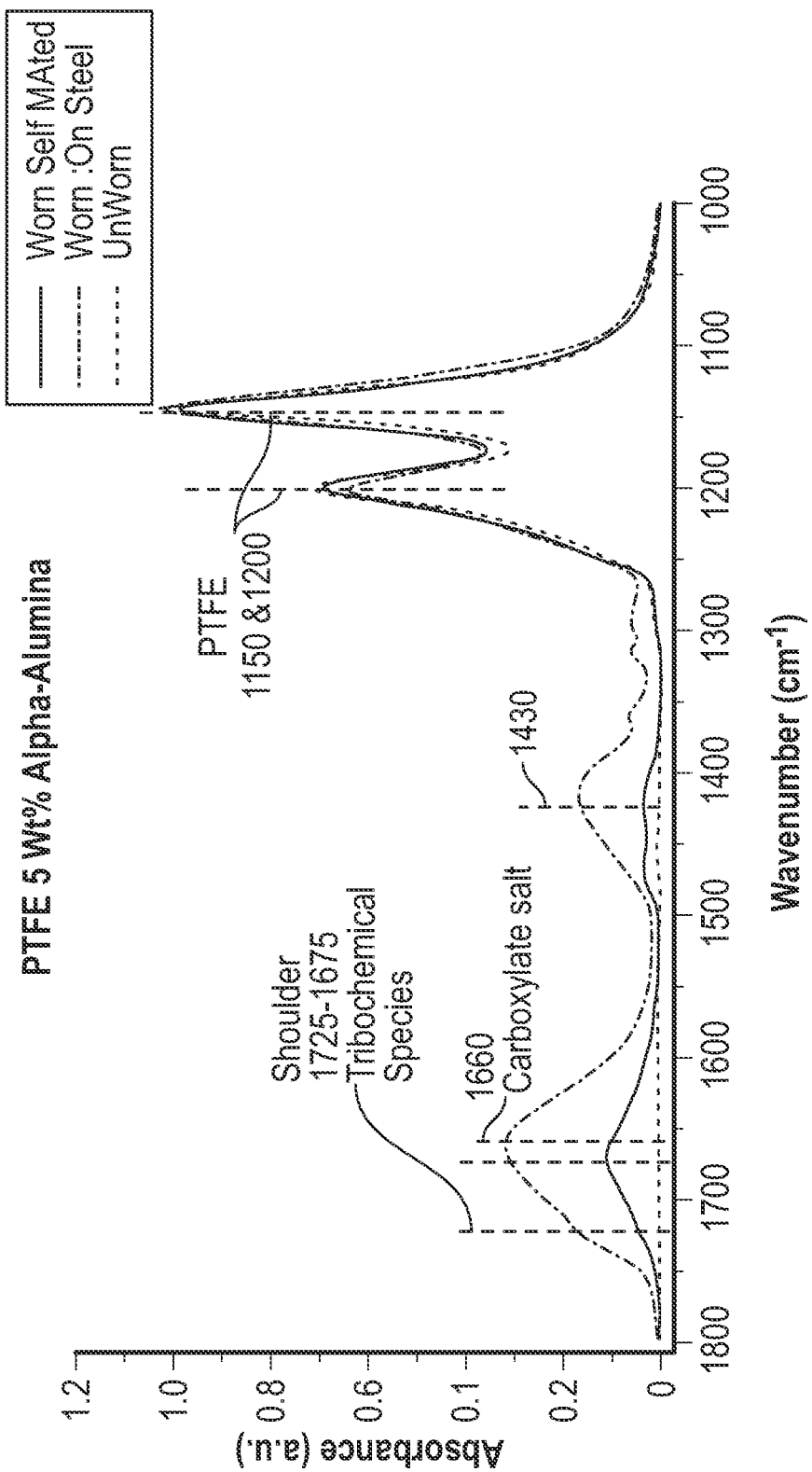
FIG. 10 depicts a plot of the absorbance of an embodiment of a composite material when unworn, worn on stainless steel, or worn in a self-mated manner.
Figure 11:
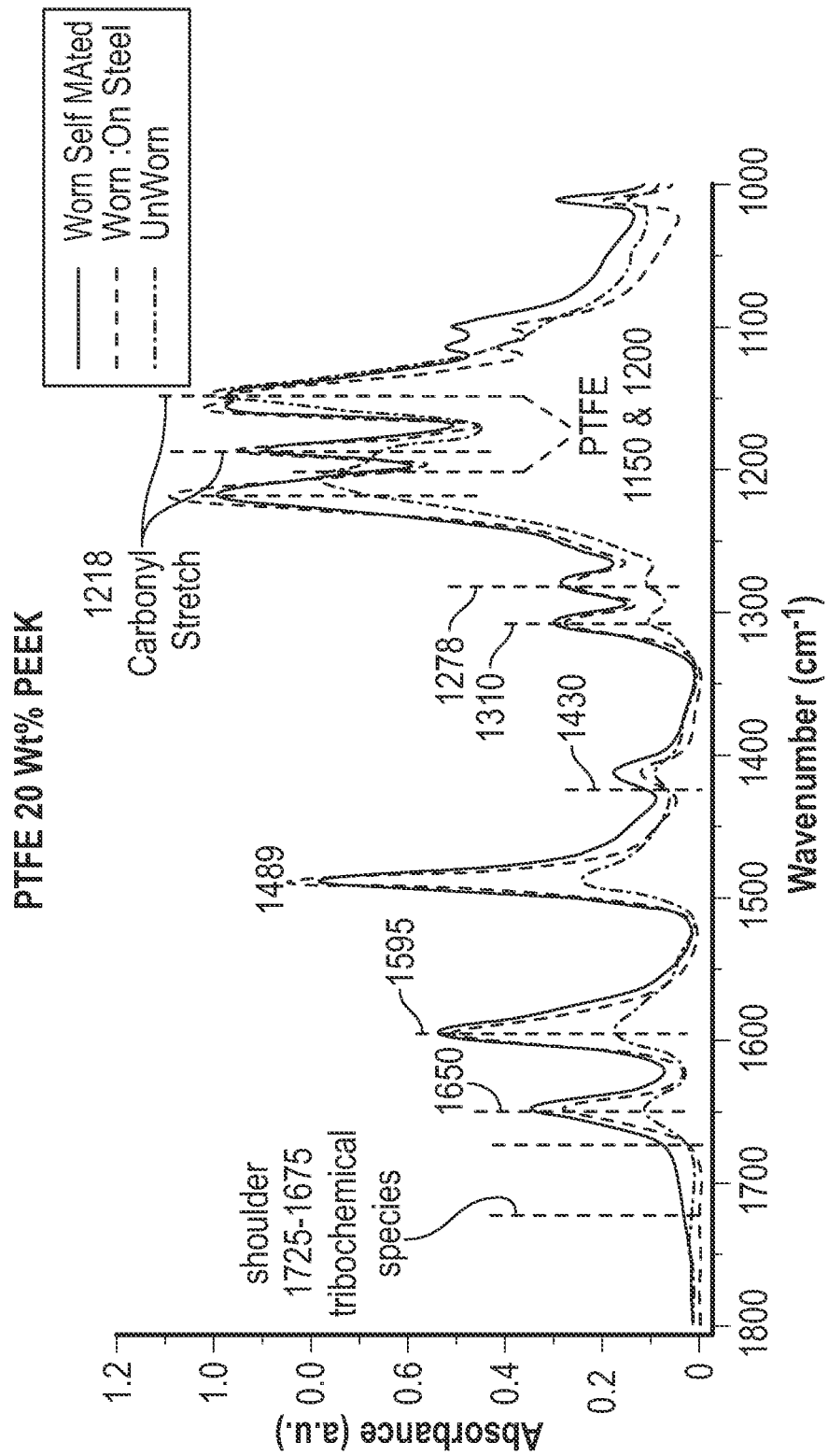
FIG. 11 depicts a plot of the absorbance of an embodiment of a composite material when unworn, worn on stainless steel, or worn in a self-mated manner.
Figure 12:
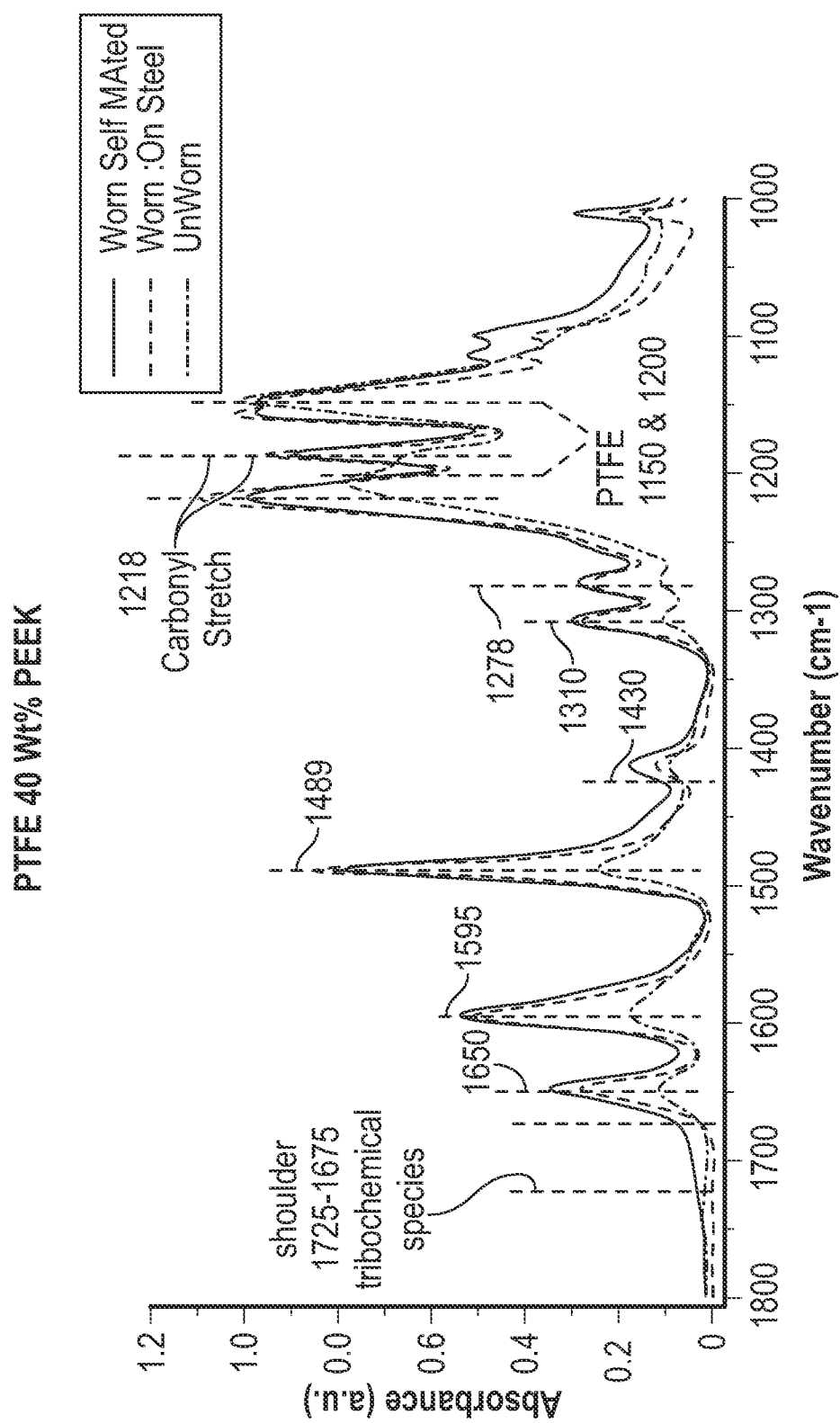
FIG. 12 depicts a plot of the absorbance of an embodiment of a composite material when unworn, worn on stainless steel, or worn in a self-mated manner.
Figure 13:
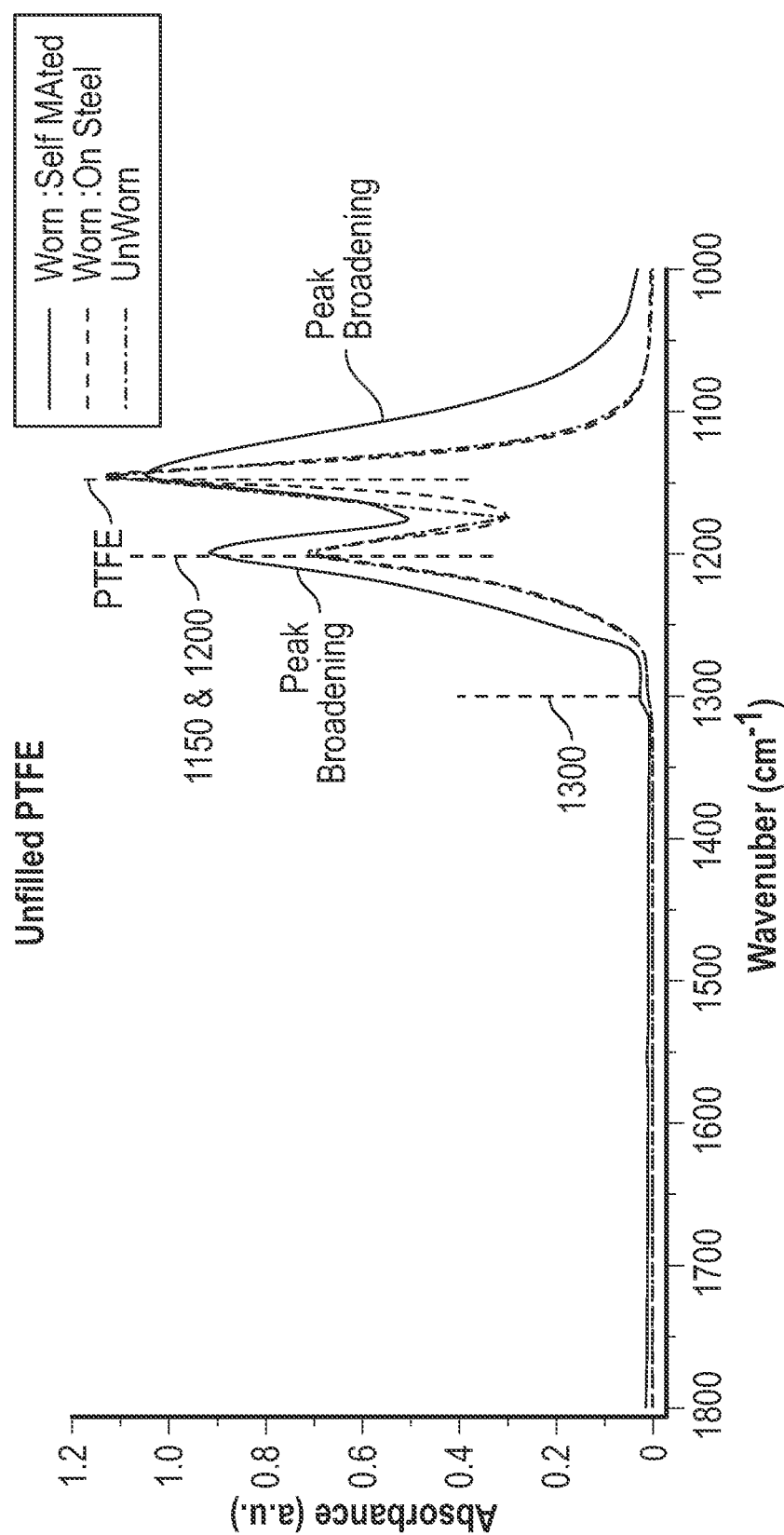
FIG. 13 depicts a plot of the absorbance of an embodiment of a composite material when unworn, worn on stainless steel, or worn in a self-mated manner.

FIG. 10 depicts a plot of the absorbance of Sample 1 when unworn, worn on 304SS, or worn in the self-mated manner provided herein. FIG. 11 depicts a plot of the absorbance of Sample 4 when unworn, worn on 304SS, or worn in the self-mated manner provided herein. FIG. 12 depicts a plot of the absorbance of Sample 6 when unworn, worn on 304SS, or worn in the self-mated manner provided herein. FIG. 13 depicts a plot of the absorbance of Sample 2 when unworn, worn on 304SS, or worn in the self-mated manner provided herein. The sliding-induced chemical changes at the material sliding interface, i.e., "tribochemistry", observed in these systems likely resulted from the shear induced chain scission of the fluoropolymer during sliding and its degradation and reaction with the environmental water/oxygen. Also observed was the accumulation of the filler material (such as PEEK or alumina) at the sliding interface as well, which tended to reinforce and improve the mechanical properties of the sliding interface. Although IR spectroscopy was used in this example, other analytical techniques can be used to detect and/or measure the sliding-induced chemical changes, i.e., "tribochemistry".

The invention claimed is:

1. A method comprising:
   providing a first article (i) formed at least in part of a first composite material, or (ii) having a surface on which the first composite material is disposed, the first composite material comprising—
   a first fluorinated polymer; and
   a first filler dispersed in the fluorinated polymer;
      wherein the first filler is present at an amount of about 3% to about 50%, by weight, based on the total weight of the first fluorinated polymer and the first filler, and
      wherein the first filler comprises a first polymeric filler;
   providing a second article (i) formed at least in part of a second composite material, or (ii) having a surface on which the second composite material is disposed, the second composite material comprising—
   a second fluorinated polymer; and
   a second filler dispersed in the second fluorinated polymer;
      wherein the second filler is present at an amount of about 3% to about 50%, by weight, based on the total weight of the second fluorinated polymer and the second filler, and
      wherein the second filler comprises a second polymeric filler;
   contacting the first composite material and the second composite material; and
   applying a force to the first article, the second article, or the first article and the second article while the first composite material and the second composite material are in contact with each other, wherein the force is effective to move the first article relative to the second article.

2. The method of claim 1, wherein the first filler, the second filler, or both the first filler and the second filler do not comprise alumina.

3. The method of claim 1, wherein the force comprises a cycle of forces, wherein the cycle of forces comprises a first force, wherein the first force is:
   is a first force applied to the first article while the first composite material and the second composite material are in contact with each other at a first position, wherein the first force is effective to move the first article to a second position, wherein the first article and the second article are in contact with each other at the first position, the second position, and while the first article is moved from the first position to the second position; and
   a second force applied to the first article when the first article is at the second position, wherein the second force is effective to move the first article from the second position to the first position or a third position, wherein the first article and the second article are in contact with each other at the second position, the first position or the third position, and while the first article is moved from the second position to the first position or the third position.

4. The method of claim 3, wherein when the cycle of forces is applied 10,000 to 3,000,000 times, the first force and the second force comprise a compressive force of at least 200 N, and the first composite material, the second composite material, or the first composite material and the second composite material exhibit a steady state wear rate of about $10^{-9}$ mm$^3$/Nm to about $10^{-8}$ mm$^3$/Nm.

5. The method of claim 4, wherein (i) the first fluorinated polymer is a first perfluorinated polymer, (ii) the second fluorinated polymer is a second perfluorinated polymer, or (iii) the first fluorinated polymer is a first perfluorinated polymer, and the second perfluorinated polymer is a second perfluorinated polymer.

6. The method of claim 3, wherein when the cycle of forces is applied 10,000 to 3,000,000 times (i) the first fluorinated polymer, the second fluorinated polymer, or the first fluorinated polymer and the second fluorinated polymer at least partially degrades via (a) shear-induced chain scission, (b) reaction with water and/or oxygen, or (c) a combination thereof, and/or (ii) a concentration of the first filler, the second filler, or the first filler and the second filler increases at an interface between the first composite material and the second composite material.

7. The method of claim 6, wherein the first fluorinated polymer, the second fluorinated polymer, or the first fluorinated polymer and the second fluorinated polymer are independently selected from a polytetrafluoroethylene of the following formula:

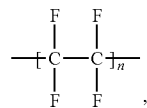

wherein n is 20,000 to 200,000.

8. The method of claim 1, wherein the first filler is evenly dispersed in the first fluorinated polymer.

9. The method of claim 1, wherein the second filler is evenly dispersed in the second fluorinated polymer.

10. The method of claim 1, wherein the first filler is present at an amount of about 20% to about 50%, by weight, based on the total weight of the first fluorinated polymer and the first filler.

11. The method of claim 1, wherein the first filler comprises a first aryl polymeric filler.

12. The method of claim 11, wherein the first aryl polymeric filler comprises polyether ether ketone.

* * * * *